United States Patent
Frey, Jr. et al.

(10) Patent No.: US 7,307,251 B2
(45) Date of Patent: Dec. 11, 2007

(54) ACTIVE BACKGROUND CONTROL FOR INFRARED CAMERAS

(75) Inventors: Robert D. Frey, Jr., Bolton, MA (US);
Walter P. Watson, Lowell, MA (US);
William E. Shaw, Marlborough, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 260 days.

(21) Appl. No.: 11/038,389

(22) Filed: Jan. 21, 2005

(65) Prior Publication Data
US 2007/0246648 A1 Oct. 25, 2007

(51) Int. Cl.
*G01D 18/00* (2006.01)

(52) U.S. Cl. .................. 250/252.1; 396/106

(58) Field of Classification Search ............ 250/252.1; 396/106
See application file for complete search history.

(56) References Cited

U.S. PATENT DOCUMENTS 4,827,300 A * 5/1989 Lam ........................ 396/106

OTHER PUBLICATIONS

Wolfe, William et al., *The Infrared Handbook*, 1985, pp. 20-12-20-15, The Infrared Information and Analysis (IRIA) Center, Environmental Research Institute of Michigan.

* cited by examiner

*Primary Examiner*—David Porta
*Assistant Examiner*—Shun Lee
(74) *Attorney, Agent, or Firm*—Snider & Associates

(57) ABSTRACT

A light source is injected into an optical path of a camera to provide a controlled background to insure optimum uniformity of performance of the camera. An optical system, camera, image background measurement system, source intensity control, and light source comprise a closed loop control around the light source to control an operating point of the camera. Intensity of the light source is decreased as intensity of a background flux is increased.

18 Claims, 3 Drawing Sheets

ACTIVE BACKGROUND CONTROL FOR INFRARED CAMERAS

FIELD OF THE INVENTION

This invention relates to cameras used in dynamic operating environments where scene average can shift during operation. One application applies to missiles used for interception of other airborne devices which may include missiles and aircraft. Another may be bombs employing sensors for precision strike falling through the atmosphere. During high-speed flight, a window through which an infrared (IR) camera is directed necessarily increases in temperature, thereby producing infrared radiation which is received by the camera. This radiation is a source of dynamic background flux which can interfere with camera calibration.

BACKGROUND OF THE INVENTION

An infrared system may operate in an environment where the system views the scene through a window while flying through the atmosphere. The window will heat throughout the mission resulting in a dynamic background. The camera is calibrated with a two-point fit to a response measurement for each pixel. There is a residual gain error in the calibration due to a calibration error, there are errors due to non-linearity of the pixel response and there is instability in the response over the storage life of the seeker. These gain correction errors when coupled to a highly dynamic background which shift the operating point (background flux level) of the camera can result in significant degradation of uniformity (noise) impacting mission performance.

Attempts to perform automatic offset correction based on the scene using either sensed or induced motion (dither) are inherently limited in the presence of objects in the field of view. These approaches tend to assume that the displacement of the object space image allows an algorithm to separate the object space from the camera fixed pattern noise that does not shift. The problem with these approaches is that the object space image will change from one frame to the next as it moves with respect to the camera system. Also, the finite spatial sampling of the camera assures that there will be substantial differences in the count distribution of an object image due to displacement of the object relative to the sampling grid.

The prior art includes a Jones calibration source which is used to calibrate cameras. The Jones calibration source is a small source which is placed near an entrance pupil of a camera system to uniformly flood a focal plane array and is described in *The Infrared Handbook* by William L. Wolfe and George J. Zissis (revised edition 1985, prepared by Infrared Information and Analysis (IRIA) Center, Environmental Research Institute of Michigan for the Office of Naval Research, Department of the Navy, Washington, D.C.). The focal plane array is a charge-coupled device which has an output which is in electronic form.

BRIEF SUMMARY OF THE INVENTION

The invention provides a controlled background in order to ensure optimum uniformity performance of a camera when subjected to dynamic environments. This invention utilizes a Jones calibration source to control and stabilize the background during dynamic operation. A Jones calibration source which is a small light source placed near the entrance pupil of a camera system to uniformly flood a focal plane array is used. Typically, the source is set to two flux levels in order to perform a two-point calibration in a radiometer. The invention introduces a closed loop control around the source to actively control the operating point (flux level) of the camera. The uniformity calibration and subsequent operation of the camera are, therefore, constrained to the calibration point ensuring optimum uniformity.

A camera having a controlled background comprising: an optical system having at least one pupil; a camera which receives light from said optical system having an electronic image output; an image background measurement system connected to the camera; a light source intensity control connected to the image background measurement system for controlling intensity of the light source; wherein said light source is located near said at least one pupil; and wherein intensity of said light source varies in an inverse relationship to the background flux.

A camera having a controlled background comprising: an optical system having at least one pupil; a camera which receives light from said optical system having an electronic image output; an image background measurement system connected to the camera; a light source intensity control connected to the image background measurement system for controlling intensity of the light source; wherein the intensity control sets a plurality of flux levels of said Jones calibration source in order to perform a plurality of calibrations in a camera; and wherein intensity of said light source varies in an inverse relationship to background flux.

A method of controlling background of a camera in order to obtain uniformity of performance of the camera when subjected to a dynamic environment comprising the steps of: placing the camera in a dynamic environment which changes a source of background light flux; receiving the background flux in an optical system; sensing the background flux after passing through the optical system in the camera wherein the camera has an electronic image output; measuring image background light flux; controlling intensity of a light source located near a pupil of said optical system; and controlling intensity of said light source in an inverse relationship to said background flux increases.

DETAILED DESCRIPTION OF THE INVENTION

Figure 1:
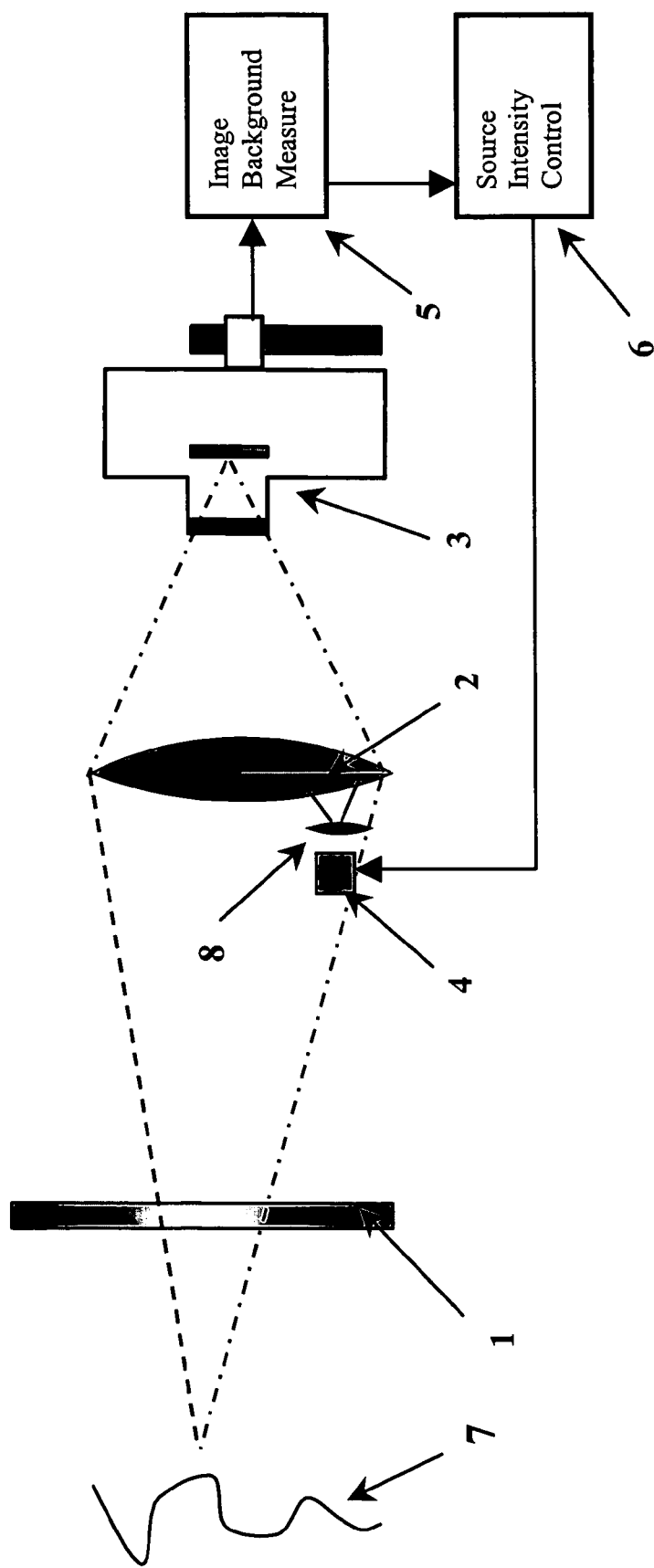
FIG. 1 shows the overall operation system including the closed loop control and placement of the Jones calibration light source.

FIG. 1 indicates the key concepts of the invention. The system is viewing the scene through a window (1) acting as a source of background flux. During operation such as high-speed flight, the window heats up over time and introduces background flux into the camera system in the form of infrared radiation. The window may be absent and the object space scene may provide the changing background flux alone. Also, the optical system (2) introduces background through emission in the wave band of the system due to either self-emission or leakage from other external sources which may vary with time during camera operation.

The camera (3) observes the scene (7) through an optical system (2). The optical system illustrated here is a single lens defractive system. In general, the optical system can consist of defractive and/or reflective elements and may include multiple elements. The key to the invention is placement of a controlled Jones source (4) at the entrance pupil of the system. The term Jones calibration source is used in this description because it is a known calibration device, however, the source of light 4, 11 may be any source of light which provides light to a camera optical system 2 and camera 3. The source could also be placed at locations in the optical path where the entrance pupil is reimaged, but the preferred location is at the entrance pupil because it will calibrate the system through the entire optical path.

Figure 2:
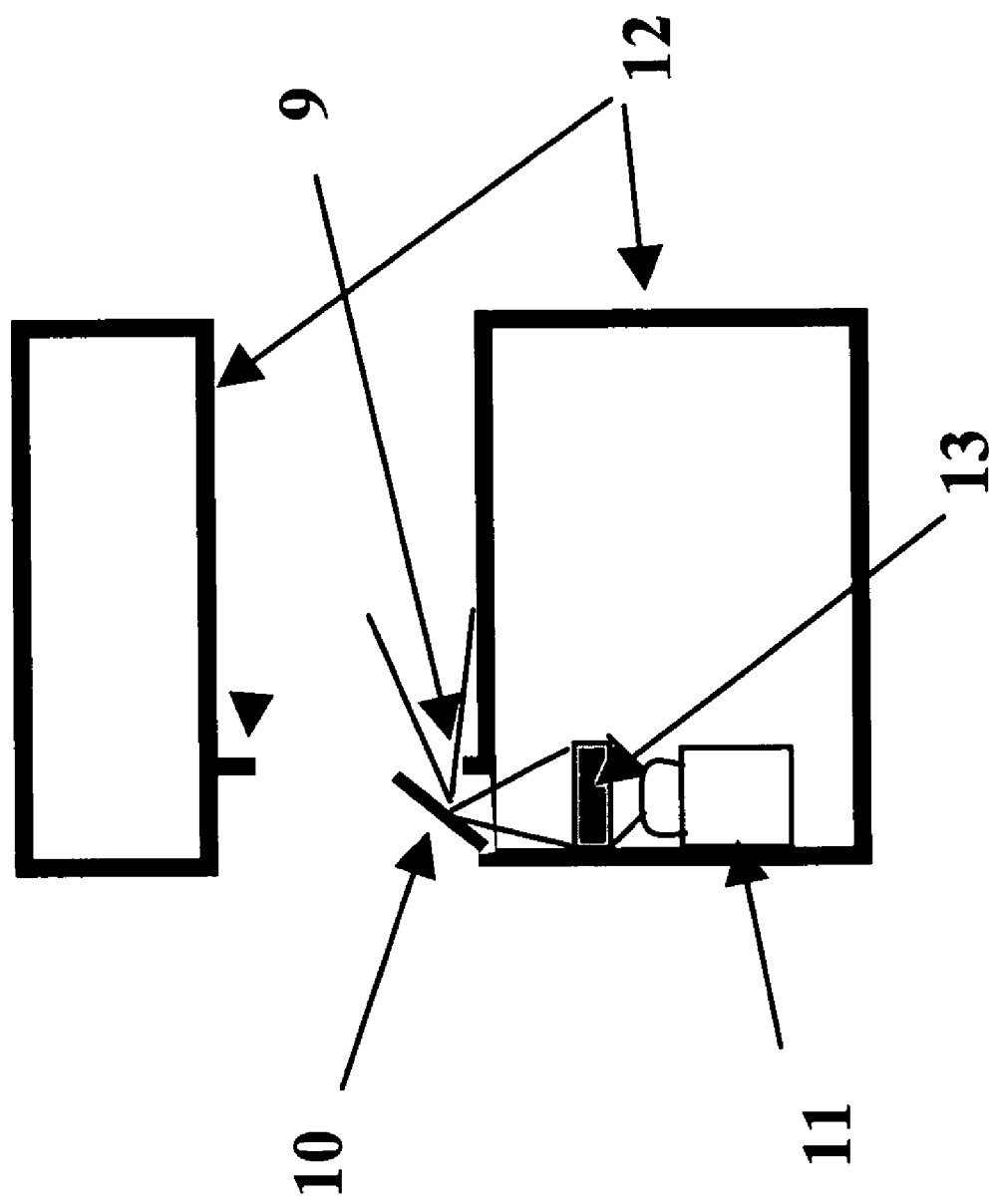
FIG. 2 shows an embodiment of the invention which utilizes a periscope to direct light from the Jones calibration light source into an optical path.

The Jones calibration source or light source 4, 11 is an in-band source of irradiance, such as a diode, resistive heating wire or other source of radiation. The choice of source is dependent on background dynamics and available power. Ideally, a diode would be employed using a lens 13, 8 that will match the emission steradiance of the diode source to the cone defined by the half field angle of the camera. A diode is preferred due to size, power and response time performance but may be limited in terms of output power. A resistive source can provide significantly greater output but with longer response time. This can be compensated for in the control loop. The source should be placed at or very near the entrance pupil in order to ensure uniform illumination of the focal plane. Ideally, to minimize obscuration of the aperture, the source would be placed outside the optical path and its output injected at the entrance pupil as shown in FIG. 2 and its output injected at the entrance pupil using a periscope 10 attached to the telescope 12 just beyond the aperture stop 9.

As shown in FIG. 1, the camera 3 observes a summation of the flux from the scene 7, window background flux 1, optical path flux 2 and the Jones source flux 4. The system measures the background from the output image of the camera 3. The measure of the background is dependent on the complexity of the scene. The image background measure 5 may be an average of the image for complex scenes or based on the maximum occurrence of a count value based on a histogram of the scene in less complex scenes.

The Jones source 4 output level is controlled based on the measure of the image background in order to maintain the operating point through the source intensity controller 6. The source intensity controller 6 consists of a control of the current, voltage or power driving the source dependent on the measured background.

Figure 3:
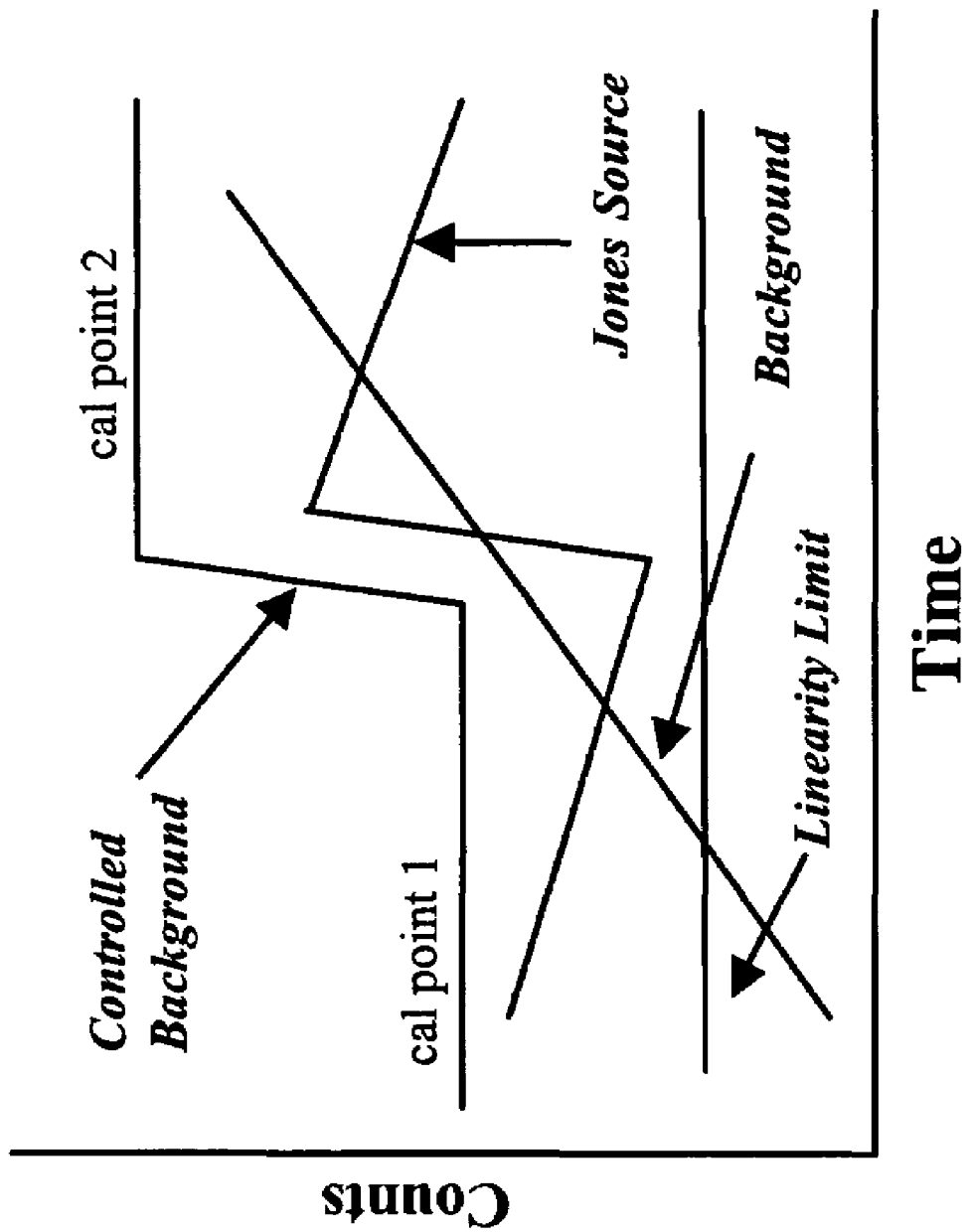
FIG. 3 shows how the Jones source supplies the difference between the calibration point and the background.

At calibration prior to operation, the system establishes operating points at specific background levels. The system during operation selects an operating background flux level from the calibration and dynamically adjusts the Jones source 4 to maintain the background through fluctuations of total system background If the system background exceeds the calibration background, the system then can switch to a new operating background. This operation is illustrated in FIG. 3. In this figure, the background is increasing with time. Two calibration points have been established in calibration operation prior to observation of the scene. As the background flux, as measured in output counts from the camera, increases, the Jones source output is decreased in order to maintain a constant background. As the scene background approaches calibration point 1, the camera control selects a new calibration point, again set prior to observation of the scene, at a higher count level. The Jones source supplies the difference between the calibration point and the scene background. As can be seen in FIG. 3, as the background increases, the intensity of the Jones source changes in an inverse relationship (decreases) when the cal point is shifted from 1 to 2, the Jones source shifts upward to compensate for the cal point 2, and then again responds in an inverse relationship to the background. Focal planes have a lower bound of operation where they no longer are linear. When operating a system against a low background, operation in the non-linear region degrades performance, as it is difficult to calibrate a system for this region. Incorporation of a controlled background source will elevate the background to ensure linear operation over the entire operational range of the camera, even in low background flux conditions. This is illustrated in FIG. 3 where the background is below the linearity limit and the Jones source adds background to bring the camera into linear operation.

The invention claimed is:

1. A camera having a controlled image background comprising:
    a camera optical system having at least one pupil;
    a camera which receives light from said optical system having an electronic camera image output;
    a camera focal plane image background flux measurement system connected to the camera;
    a light source intensity control connected to the camera image background flux measurement system for controlling intensity of a light source;
    wherein said light source is located near said at least one pupil to uniformly flood said camera focal plane;
    wherein intensity of said light source varies in an inverse relationship to the camera image background flux; and
    wherein the light source supplies a difference between calibration points and scene background.

2. A camera having a controlled image background according to claim 1, wherein said at least one pupil is a camera entrance pupil.

3. A camera having a controlled image background according to claim 2, wherein said light source is located at said camera entrance pupil.

4. A camera having a controlled image background according to claim 1, wherein said light source is a Jones calibration source.

5. A camera having a controlled image background according to claim 1, wherein said camera optical system, camera focal plane image background flux measurement system, source intensity control, and light source comprise a closed loop control around the light source to control an operating point of the camera.

6. A camera having a controlled image background according to claim 1, wherein said light source comprises a diode or a resistive source.

7. A camera having a controlled image background according to claim 1, wherein the light source is placed outside of an optical path of said optical system.

8. A camera having a controlled image background comprising:
    a camera optical system having at least one entrance pupil;
    a camera focal plane which receives light from said optical system having an electronic camera image output;
    a camera image background flux measurement system connected to the camera focal plane which receives light from said optical system;
    a light source intensity control connected to the camera image background flux measurement system for controlling intensity of a Jones calibration source;

wherein the intensity control sets a plurality of flux levels of said Jones calibration source in order to obtain calibration points;

wherein intensity of the Jones calibration source varies in an inverse relationship to the camera image background flux; and wherein the Jones calibration source supplies a difference between said calibration points and scene background.

9. A camera having a controlled image background according to claim 8, wherein said Jones calibration source is located at an entrance pupil of said at least one entrance pupil.

10. A camera having a controlled image background according to claim 8, wherein said Jones calibration source is placed outside of an optical path of said optical system.

11. A camera having a controlled image background according to claim 8, wherein said Jones calibration source comprises a diode or a resistive source.

12. A method of controlling image background of a camera in order to obtain uniformity of performance of the camera when subjected to a dynamic environment comprising the steps of:

placing the camera having a focal plane array in a dynamic environment which changes a source of image background light flux;

receiving the image background flux in an optical system;

sensing the image background flux after passing through the optical system in the camera focal plane array wherein the camera has an electronic image output;

measuring image background light flux;

controlling intensity of a light source located near a pupil to uniformly flood the camera focal plane array of said optical system of said camera;

controlling intensity of said light source in an inverse relationship to said image background flux;

setting a plurality of flux levels of said light source located near said pupil in order to obtain a plurality of calibration points prior to operation and wherein during operation said light source supplies a difference between said calibration points and scene background.

13. A method of controlling image background of a camera in accordance with claim 12, wherein said pupil is at an entrance pupil.

14. A method of controlling image background of a camera in accordance with claim 13, wherein said light source is located at said entrance pupil.

15. A method of controlling image background of a camera in accordance with claim 12, wherein said light source is a Jones calibration source.

16. A method of controlling image background of a camera in accordance with claim 12, further comprising a step of controlling an operating point of the camera with a closed loop control comprising the camera, image background measurement system, source intensity control, and the light source.

17. A method of controlling image background of a camera in accordance with claim 12, further comprising a step of placing the light source outside of an optical path of the optical system.

18. A method of controlling image background of a camera in accordance with claim 12, further comprising locating a periscope in front of an aperture stop of said optical system.

* * * * *